United States Patent
Surjan et al.

(12) 
(10) Patent No.: US 6,403,678 B1
(45) Date of Patent: Jun. 11, 2002

(54) ROPE OF CHEMICAL ANCHORING ADHESIVE

(75) Inventors: James E. Surjan, St. Charles; Richard J. Ernst, Palatine; Mark S. Timmerman, Elgin; Cyndie S. Hackl, Wauconda; Jeffrey C. Warmolts, Glen Ellyn; Eldridge Presnell, Round Lake Beach, all of IL (US)

(73) Assignee: Illinois Tool Works, Inc., Glenview, IL (US)

(*) Notice: Subject to any disclaimer, the term of this patent is extended or adjusted under 35 U.S.C. 154(b) by 0 days.

(21) Appl. No.: 09/626,333

(22) Filed: Jul. 26, 2000

(51) Int. Cl.$^7$ .................................................. C08K 9/10
(52) U.S. Cl. ...................................... 523/211; 523/220
(58) Field of Search ......................................... 523/211

(56) References Cited

U.S. PATENT DOCUMENTS

| | | | |
|---|---|---|---|
| 3,494,990 A | | 2/1970 | Balint |
| 3,708,379 A | | 1/1973 | Flint |
| 3,781,965 A | | 1/1974 | Bone |
| 3,837,981 A | | 9/1974 | Flint |
| 3,900,999 A | * | 8/1975 | Callan ........................ 52/744 |
| 3,971,117 A | | 7/1976 | Osterhout et al. |
| 4,040,471 A | | 8/1977 | McCray et al. |
| 4,250,074 A | * | 2/1981 | Foscante ................... 260/32.8 |
| 4,340,637 A | | 7/1982 | Koob et al. |
| 4,560,902 A | | 12/1985 | Kardon |
| 5,027,981 A | | 7/1991 | Magister |
| 5,129,977 A | | 7/1992 | Leatherman |
| 5,229,438 A | | 7/1993 | Ishida et al. |
| 5,352,308 A | | 10/1994 | Tomihara et al. |
| 5,447,593 A | | 9/1995 | Tanaka et al. |
| 5,486,096 A | | 1/1996 | Hertel et al. |
| 5,544,981 A | | 8/1996 | Nishida et al. |
| 5,554,240 A | | 9/1996 | Toy |
| 5,563,217 A | * | 10/1996 | Davis ........................ 525/194 |
| 5,714,216 A | | 2/1998 | Banhardt et al. |
| 5,730,557 A | | 3/1998 | Skupien et al. |
| 5,731,366 A | | 3/1998 | Moench et al. |
| 5,738,939 A | * | 4/1998 | Calhoun ..................... 428/343 |
| 5,859,114 A | * | 1/1999 | Davis ......................... 524/490 |
| 5,953,879 A | | 9/1999 | Fischer et al. |

FOREIGN PATENT DOCUMENTS

| | | |
|---|---|---|
| AU | 48487/97 | 6/1998 |
| BE | 754232 | 5/1971 |
| BE | 784024 | 4/1972 |
| BE | 815338 | 9/1974 |
| BE | 830102 | 10/1975 |
| BE | 830269 | 10/1975 |
| BE | 840460 | 8/1976 |
| BE | 855086 | 9/1977 |
| DE | 2012908 | 4/1971 |
| DE | 1603819 | 8/1975 |
| DE | 2423410 | 11/1975 |
| DE | 2925508 | 1/1981 |
| DE | 3518277 | 4/1986 |
| DE | 4136145 | 5/1993 |
| DE | 4141990 | 6/1993 |
| DE | 29610947 | 8/1996 |
| DE | 197 34 302 | 2/1999 |
| DE | 197 36 850 | 2/1999 |
| DE | 197 39 764 | 3/1999 |
| EP | 144039 | 6/1985 |
| EP | 849 345 | 6/1998 |
| EP | 849345 | 6/1998 |
| FR | 1593972 | 4/1970 |
| FR | 2051848 | 2/1971 |
| FR | 2073549 | 1/1972 |
| GB | 1344741 | 1/1974 |
| GB | 1346674 | 2/1974 |
| GB | 1381276 | 1/1975 |
| GB | 2241759 | 9/1991 |
| WO | 98/55772 | 12/1998 |

OTHER PUBLICATIONS

*La nouvelle recharge pour chevilles chimiques HVU Hilti: une championne qui sait "encaisser"!*, company brochure (9 pages), Hilti (Suisse) SA, (1996).
*Technical Guide Supplement HILTI HVA Adhesive Anchoring System* (11 pages), Hilti, Inc., 1997.
Shell Resins, EPON® RESIN 828 specification sheet, Shell Oil Co., undated.
*Epoxy Curing Agents and Diluents*, Ancamine® 1856 Curing Agent specification sheet, Air Products and Chemicals, Inc., undated.
*Epoxy Curing Agents and Modifiers*, Ancamine® K54 Curing Agent specification sheet, Air Products and Chemicals, Inc., Feb. 1998.
*Epoxy Curing Agents*, Ancamine® 1767 Curing Agent specification sheet, Air Products and Chemicals, Inc., Nov. 1997.
*Epoxy Curing Agents*, specification sheets (5 pages), Air Products and Chemicals, Inc., undated.
*Acceptance Criteria For Adhesive Anchors In Concrete And Masonry Elements*, International Conference of Building Officials, Jan. 1–11, 1999.
*Iron and Steel*, Textbook, Section 6, pp. 17–30, undated.

* cited by examiner

*Primary Examiner*—Paul R. Michl
(74) *Attorney, Agent, or Firm*—Pauley Petersen Kinne & Erikson

(57) ABSTRACT

A rope of chemical anchoring adhesive useful in heavy construction applications includes first and second parts in continuous contact along an interface extending the length of the rope. The first part includes a resin and has a highly viscous, putty-like consistency. The second part includes a curing agent and has a highly viscous putty-like consistency. The rope can be cut into slugs at the construction site which are sized according to the depth of the borehole, into which the anchor pin is driven.

19 Claims, 3 Drawing Sheets

ROPE OF CHEMICAL ANCHORING ADHESIVE

FIELD OF THE INVENTION

This invention is directed to a chemical anchoring adhesive in the form of a self-contained, cuttable, elongated flexible rope. The rope can be cut or sheared to any desired slug length at the job site, allowing for on-site optimization of the amount of anchoring adhesive used in boreholes of varying depth and size. The cross-sectional composition is substantially uniform along the axial length of the rope.

BACKGROUND OF THE INVENTION

Chemical anchoring adhesives are known which are composed of two or more components that react together and cure when mixed. U.S. Pat. No. 5,730,557, issued to Skupian et al., discloses a mortar mixture capsule unit for chemical attachment of anchors in boreholes. The capsule houses a filler material, and a chemical binder system contained in smaller capsules within the filler material. The cartridge is inserted into a borehole, and a driving tool is used to insert an anchor. The driving tool imparts motion to the anchor, which ruptures both the housing capsule and the smaller capsules contained within it, causing the chemical binder system to interact and mix with the filler. The interaction and mixing causes reaction and curing of the binder system/filler mixture, thereby securing the anchor within the borehole. A similar adhesive is sold by Hilti AG under the trade name "HVU".

U.S. Pat. No. 5,731,366, issued to Moench et al., discloses a chemical plugging compound based on a free-radically polymerizable resin and a free-radical initiator spatially separated from the resin. The spatial separation can be effected by encapsulating the initiator in glass, gelatin or cellulose capsules. The plugging compound is described as being self-supporting and storage stable.

This and other prior art chemical anchoring adhesives have certain disadvantages. One disadvantage is that one or both components are fluid, and must be wrapped, encapsulated or otherwise and enclosed in a package prior to use. Thus, it is not easy to vary the amount of adhesive used in a borehole, or the size of the housing capsule, while at the job site. Put another way, oversized and undersized boreholes often receive the same amount of predetermined, pre-packaged adhesive as boreholes of standard size.

Another disadvantage is that the fluid adhesives may flow or spill from the boreholes during use, particularly after the package is ruptured by the anchor being driven. This problem is especially acute when the borehole is upside down and vertical, but also exists when the borehole is horizontal, or at an angle between horizontal and upside down vertical. Even when the adhesive is not completely fluid, the prior art cartridges are typically not self-retentive, i.e., the cartridges will fall from overhead boreholes.

Another disadvantage is that the two components, binder and filler, must be completely segregated prior to use, to prevent premature interaction and reaction. The encapsulation techniques used to accomplish this require some precision and expense. Also, there is no assurance that the smaller capsules used to contain the binder will remain evenly dispersed among the filler until the adhesive capsule is used. Uneven dispersion of the binder and filler can lead to uneven or inadequate adhesion of the anchor.

Cartridge adhesives are another type of prior art adhesive. Cartridge adhesives include two separate parts which are simultaneously injected into a borehole using a two-barrel caulking gun which brings the two parts together at the point of injection, whereupon they react upon entering the borehole. Disadvantages of cartridge adhesives include excessive packaging waste, excessive adhesive waste due to unmixed, unused material remaining in the caulking barrels, and insufficient viscosity, which permits the material to run out of vertical overhead boreholes, and to sag in horizontal boreholes.

SUMMARY OF THE INVENTION

The present invention is directed to a two-part chemical anchoring adhesive in the form of a self-contained rope. The term "rope" refers to any elongated flexible form having a ratio of length to mean diameter of at least 10:1. The term "self-contained" means that the chemical anchoring adhesive is sufficiently viscous that it does not flow, and generally does not deform, unless subjected to an external force. Generally, this requires the adhesive to have a thick putty-like consistency, and a viscosity of about 5 million to about 50 million centipoise. The rope may be wrapped in a plastic film, but would be self-contained with or without a wrapper.

The two parts of the chemical anchoring adhesive are formed side-by-side, or with one part surrounding the other, so that there is an interface between them. The rope has a composition which is substantially axially homogeneous. This means that, at any axial location along the length of the rope, the compositional ratio of the first part to the second part measured through a cross-section of the rope is about the same as at any other axial location along the rope. This ensures that any slug of adhesive cut from the rope will have about the same overall composition as any other slug cut from the same rope.

The first part of the adhesive comprises a resin. The first part has a viscosity between about 5 million and about 50 million centipoise, measured at 25° C. using a Brookfield Viscometer, Model DV-3, made by Brookfield Engineering Co. This viscosity range assures that the rope of adhesive may be formed, shaped, and/or cut with a knife, but will not flow. In one embodiment, the first part of the adhesive includes an epoxy resin (e.g., a liquid epoxy resin), and at least one particulate filler, in proportions required to achieve the desired viscosity.

The second part of the adhesive comprises a curing agent. The second part has a viscosity between about 5 million and about 50 million centipoise, measured using the same test equipment. The viscosity of the second part is not more than 30% higher or 30% lower than the viscosity of the first part. In the one embodiment, the second part of the adhesive includes a curing compound, a curing accelerator, and at least one particulate filler, in proportions required to achieve the desired viscosity.

The two parts are directly joined along an interface, without causing significant premature reaction between the two parts and without encapsulating one relative to the other. Because of their high viscosity, the two-part adhesive can be employed in an upside down vertical borehole, a horizontal borehole, or a borehole having an angle between horizontal and upside down vertical, and will not spill or flow from the borehole.

The first and second parts can be extruded, pressed, or otherwise directly joined together. The rope may have a cylindrical, rectangular, square, triangular, or other suitable shape. The rope may have any suitable cross-sectional diameter, and any suitable length provided that the length of the rope is at least 10 times its diameter. When a wrapper is used, it may be a plastic film, metal foil, paper, or the like.

The rope of anchoring adhesive may be cut or sheared to any size, depending on the depth of the borehole. The proper amount of adhesive can be measured by the depth of the borehole, i.e., by inserting a rope end into the borehole as far as possible, cutting the rope at the top of the borehole to form a slug having a length equal to the borehole depth. If the boreholes vary in depth, the adhesive may be cut or sheared to various lengths on the job site, to provide the optimum amount of adhesive slug for each borehole. Thus, the adhesive composition is both self-measuring and self-retentive due to its shape, viscosity and axial homogeneity. The rotational and/or axial motion of an anchor pin in the borehole, transmitted from a driving tool, causes mixing of the two adhesive parts in the borehole, and curing in the space between the anchor pin and wall of the borehole.

With the foregoing in mind, it is a feature and advantage of the invention to provide a rope formed of highly viscous, two-part anchoring adhesive which can be used in a downward or horizontally-opening borehole without spilling from the borehole.

It is also a feature and advantage of the invention to provide a two-part anchoring adhesive rope having a consistent composition along its axial length, which provides consistent high-quality anchoring force in heavy construction applications, and which can be cut to any desired length on the job site, or before reaching the job site.

The foregoing and other features and advantages will become further apparent from the following detailed description of the presently preferred embodiments, read in conjunction with the accompanying drawings and examples. The detailed description, drawings and examples are illustrative rather than limiting, the scope of the invention being defined by the appended claims and equivalents thereof.

DETAILED DESCRIPTION OF THE PRESENTLY PREFERRED EMBODIMENTS

Figure 2:
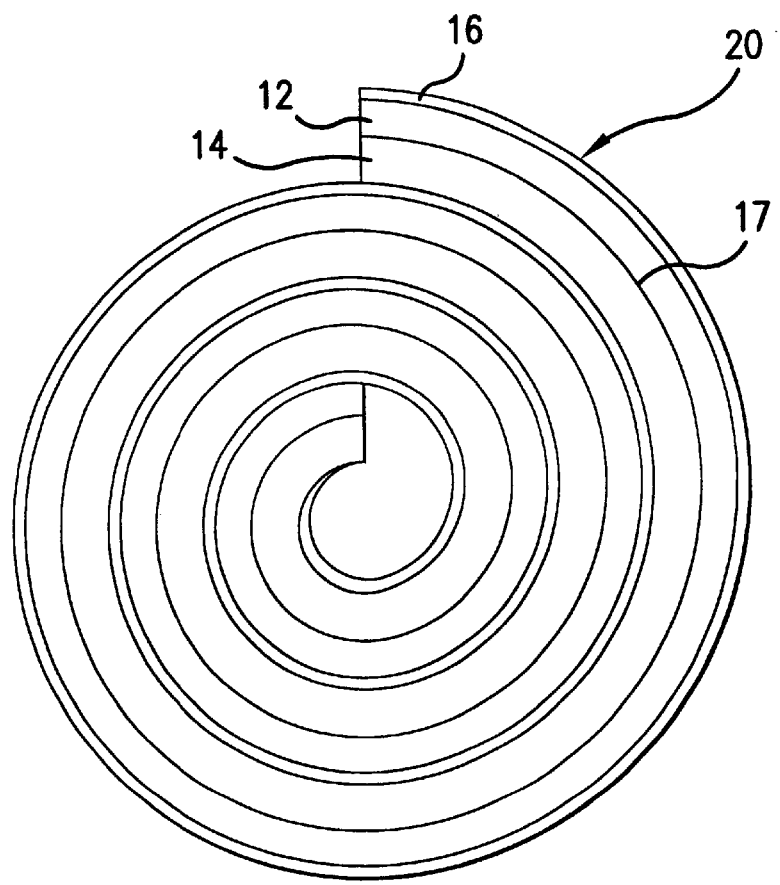
FIG. 2 illustrates the highly viscous adhesive composition, prior to cutting into slugs, wound up into a coiled rope.

The present invention is directed to a rope of chemical anchoring adhesive. Referring to FIG. 2, the rope 20 may be wound up into a coil during storage, and may be unwound as it is used. Rope 20 of adhesive includes a first part 12, which includes a resin component, and a second part 14, which includes a curing agent, joined together and touching each other along an interface 17. The rope 20 may be wrapped around its circumference with a film 16.

Figure 4A:
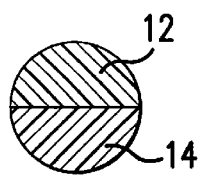
FIGS. 4(a)–4(i) illustrate, in cross-section, a wide variety of extruded configurations for the two parts of the adhesive composition.
Figure 4B:
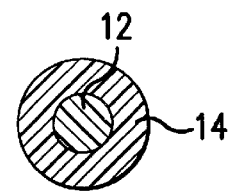
Figure 4C:
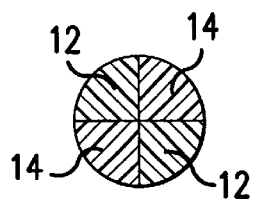
Figure 4D:
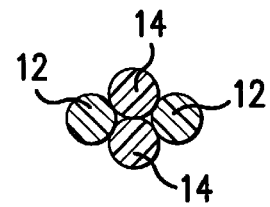
Figure 4E:
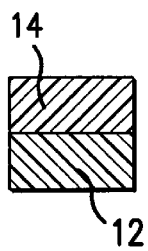
Figure 4F:
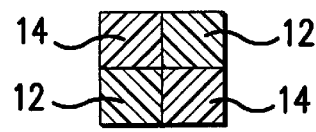
Figure 4G:
Figure 4H:
Figure 4I:
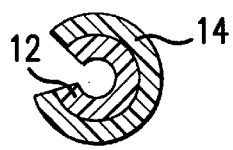

The rope 20, when uncoiled and extended in a straight line, should have a length to diameter ratio of at least about 4, preferably at least about 10, more preferably at least about 15. The rope 20 may have a cylindrical or elliptical cross-section as shown in FIGS. 4(a) through 4(c) (with that of FIG. 4(a) being preferred), a threaded cross-section including a plurality of adjacent filaments as shown in FIG. 4(d), a square or rectangular cross-section as shown in FIGS. 4(e) through 4(g), a triangular cross-section as shown in FIG. 4(h), a curled cross-section as shown in FIG. 4(i), or any other suitable configuration. The preferred shape of the rope 20 may depend, to some extent, on the shape of the borehole into which it is inserted. It is preferred that the rope 20 be configured so that roughly equal amounts of components 12 and 14 are exposed at the surface, so as to face the wall of the borehole at the start of mixing. An example of a preferred configuration is shown in FIG. 4(a). If only one component faces the wall, the mixing is less homogeneous because a disproportionate amount of that component remains adjacent to the wall.

The rope 20 has a shape and composition which are substantially consistent and uniform along the entire length of rope 20. This means that the cross-sectional shapes of rope 20 as shown in any of FIGS. 4(a)–4(i), and weight ratios of the first part 12 and second part 14, are substantially consistent and unchanged along the length of rope 20. The interface 17 between first part 12 and second part 14 extends the length of the rope 20. The adhesive rope 20 (excluding the wrapper 16) should contain about 20–80% by weight of each of the first and second parts 12 and 14, based on the combined weight of the first part 12 and the second part 14. Preferably, the rope 20 contains about 35–75% by weight of the first part 12 and about 25–65% by weight of the second part 14, more preferably about 52–65% by weight of the first part 12 and about 35–48% by weight of the second part 14, most preferably about 57% by weight of the first part 12 and about 43% by weight of the second part 14. The rope 20 is surrounded on its side by a wrapper 16 which may be plastic film, aluminum foil, paper or the like, and is preferably a polyethylene or polypropylene film.

Figure 1:
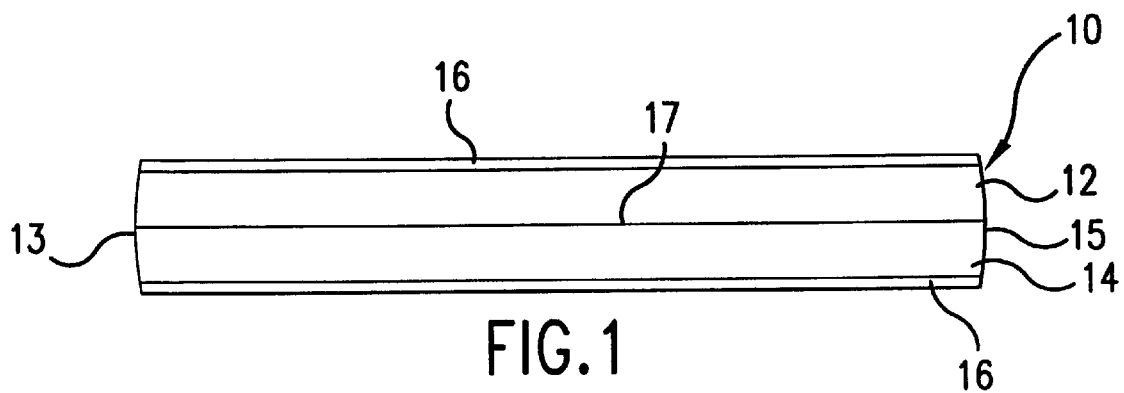
FIG. 1 illustrates a segment or slug of the highly viscous, essentially solid anchoring adhesive of the invention, prior to insertion into a borehole.
Figure 3:
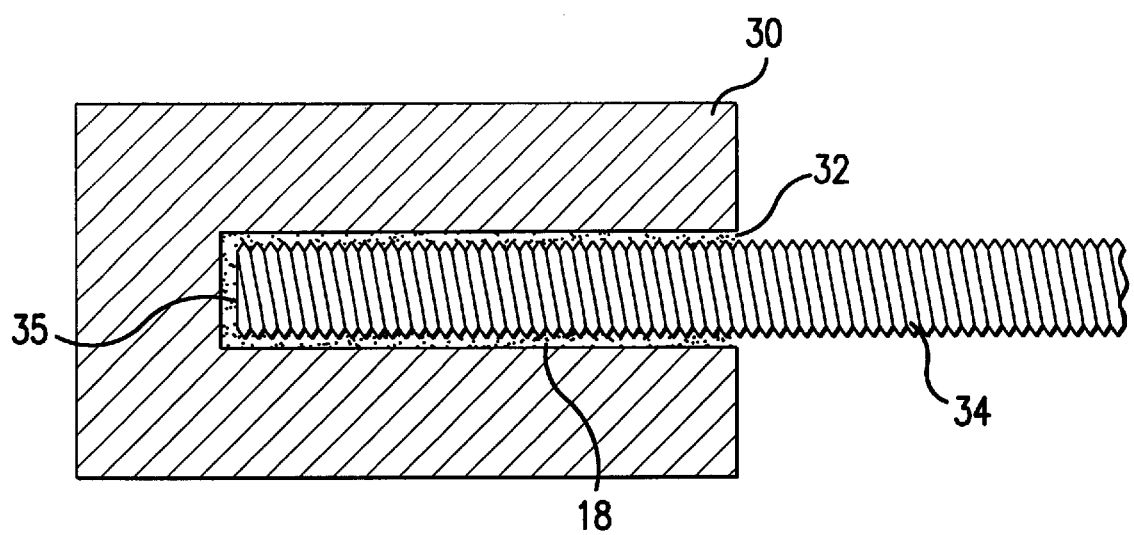
FIG. 3 illustrates a borehole, and an anchoring pin held into the borehole, using the highly viscous adhesive composition.

The rope 20 of adhesive composition may be cut to any desired length to form slugs 10, each having ends 13 and 15 as shown in FIG. 1. This cutting may occur at the construction site, so as to form slugs 10 of different lengths corresponding to varying depths of boreholes. Referring to FIG. 3, for instance, rope 20 may be inserted into borehole 32 in structure 30 as far as possible, and then cut at the entrance of the borehole leaving a slug 10 whose length substantially corresponds to the depth of the borehole. A driving tool (not shown) is then used to drive an anchor pin 34 into the borehole 32. A typical anchor pin 34 may be threaded, and may have a flat or pointed forward end 35. A typical driving tool uses rapid rotational motion to spin the anchor pin into the borehole. Some driving tools employ a combination of hammering (axial motion) and rotational motion.

The movement of the driving tool, and consequent motion of the anchor pin 34, causes disintegration of the wrapper 16 and mixing of the first part 12 and second part 14 of adhesive slug 10, within the borehole. The wrapper 16 shreds and mixes with the adhesive parts and, to some extent, may aid in the mixing. The threads on the anchor pin 34 aid in the mixing. As the anchor pin 34 is driven into the borehole 32, the entire adhesive slug 10 is blended into a substantially homogeneous mixture 18 which fills most of the spaces between anchor pin 34 and the inner walls of borehole 32. The mixing action also causes substantial curing of the mixture 18 to firmly secure the anchor pin 34 within borehole 32.

The first part 12 of the adhesive rope 20 has a viscosity of about 5 million to about 50 million centipoise at 25° C., preferably about 20 million to about 45 million centipoise, more preferably about 30 million to about 40 million centipoise. The viscosity is measured using a Brookfield Viscometer, Model DV-3, made by Brookfield Engineering Co., using the procedure set forth in the manufacturer's instructions. The second part 14 of the adhesive rope 20 has a viscosity of about 5 million to about 50 million centipoise at 25° C., preferably about 20 million to about 45 million centipoise, more preferably about 30 million to about 40 million centipoise. The foregoing viscosities ensure that the first and second parts 12 and 14 essentially have a solid phase, putty-like consistency, allowing the adhesive rope 20 to be cut, compressed, or otherwise deformed at will, but preventing flowing, spilling and other random deformation of the adhesive composition.

To facilitate manufacturing of the two-part adhesive rope 20, and later mixing of the two parts in a borehole, the viscosities of the two parts 12 and 14 should be close to each other, and are preferably substantially matched. Generally, the viscosity of the second part 14 should be no more than 30% higher or 30% lower than the viscosity of the first part 12. Preferably, the viscosity of the second part 14 is no more than 20% higher or 20% lower than the viscosity of the first part 12. More preferably, the viscosity of the second part 14 is no more than 10% higher or 10% lower than the viscosity of the first part 12. Most preferably, the two viscosities are substantially the same.

In one embodiment, the first part 12 of the adhesive rope includes about 20–45% by weight of an epoxy resin, about 10–40% by weight of a first particulate filler, and about 40–65% by weight of a second particulate filler. Preferably, the first part 12 of the adhesive rope includes about 25–35% by weight of the epoxy resin, about 12–25% by weight of the first particulate filler, and about 45–60% by weight of the second particulate filler. More preferably, the first part 12 of the adhesive rope includes about 26–30% by weight of the epoxy resin, about 16–20% by weight of the first particulate filler, and about 52–58% by weight of the second particulate filler.

The epoxy resin is preferably a liquid epoxy derivative. Novolac epoxy resins are particularly suitable, and bisphenol epoxy resins are preferred. One particularly suitable bisphenol epoxy resin is available from Shell Chemical Co. under the trade name EPON®828. EPON®828 is a difunctional bisphenol A/epichlorohydrin derived from liquid epoxy. Other suitable epoxy resins include ARALDITE®610, available from Ciba-Geigy; and DER 331, available from Dow Chemical Co.

The first particulate filler should have an oil absorption value of at least about 30, measured using ASTM D281-31. Preferably, the first particulate filler has an oil absorption of at least about 40, more preferably at least about 50. One suitable first filler is talc, having a particle size of about 1 micron to about 50 microns. One suitable talc filler is Talc 399 sold by the Whitaker, Clark & Daniels Corporation. Other suitable talcs are Mistron ZSC from Cyprus Minerals, and MP 12-50 from Pfizer Chemical Co. Other suitable first particulate fillers, having similar particle size ranges, include calcium carbonate, glass beads, silica, fly ash, clay, and the like. These other fillers are less desirable than talc.

The second particulate filler is different from the first, and can be defined in terms of U.S. Sieve size. At least about 70% by weight of the filler particles should have a U.S. Sieve size between 16 and 45, inclusive. Preferably, at least about 80% by weight of the filler particles, and more preferably at least about 90% by weight of the filler particles, have a U.S. Sieve size between 16 and 45. Particulate filler within this size range facilitates optimum extrusion during manufacturing, excellent mixing of the adhesive during use due to action of a driving tool, shredding of the wrapper 16 during mixing, and excellent bond strength of the cured adhesive. Filler having significant amounts of larger (lower U.S. Sieve size) particles provides good in-hole mixing and wrapper shredding, but causes extrusion and/or forming difficulties during manufacture of the adhesive rope. Filler having significant amounts of smaller particles higher U.S. Sieve size) provides excellent extrusion and/or forming during manufacture of the adhesive, but facilitates poor in-hole mixing, wrapper shredding and bond strength of the adhesive.

Suitable second fillers contributing to in-hole mixing of Parts A and B include silica sand, glass beads, and quartz. One particularly suitable filler is a sand, for example, a silica sand sold as AGSCO® Sand No. 1, by the Agsco Company. For this sand, about 89.4% by weight of the particles have a U.S. Sieve size between 16 and 45.

In the one embodiment, the second part 14 of the adhesive rope 20 includes about 5–20% by weight of an amine compound, meaning an amine or chemical derivative thereof but not a tertiary amine, about 0.1–15% by weight of a tertiary amine compound, meaning a tertiary amine or chemical derivative thereof, about 1–23% by weight of a first particulate filler and about 52–87% by weight of a second particulate filler. Preferably, the second part 14 includes about 10–18% by weight of the amine compound, about 1–10% by weight of the tertiary amine compound, about 5–18% by weight of the first particulate filler and about 58–72% by weight of the second particulate filler. More preferably, the second part 14 includes about 12–16% by weight of the amine compound, about 1–5% by weight of the tertiary amine compound, about 7–12% by weight of the first particulate filler, and about 62–68% by weight of the second particulate filler.

The first and second fillers in the second part 14 are selected from the same groups of fillers as the first and second fillers in the first part 12 of the adhesive composition, and may or may not be identical to the first and second fillers in the first part 12. The amine compound acts as a curing agent once the first part 12 and second part 14 have been mixed together. The tertiary amine compound acts as an accelerator for the curing reaction.

Suitable amine compounds include amines, aliphatic amines, aminoethylpiperazine, amido amines, cycloaliphatic amines, and the like. Preferred aliphatic amines include Mannich bases. One suitable Mannich base is sold by Air Products Co. under the trade name ANCAMINE®1856. Other suitable aliphatic amines include ANCAMINE®1767 and ANCAMINE®1768.

Suitable tertiary amine compounds include ANCAMINE®110, ANCAMINE®K61B, and ANCAMINE®K54, all sold by Air Products Co., and EPI-CURE®3253 sold by Shell Chemical Co. A preferred tertiary amine is sold by Air Products Co. under the trade name ANCAMINE®K54, and is a tris-(dimethylaminomethyl) phenol.

To manufacture the adhesive rope 20, the ingredients of the first part 12 can be mixed in a first mixer, and the ingredients of the second part 14 can be mixed in a second mixer. The separate mixers can be drum tumblers, sigma blade mixers, planetary mixers, extrusion mixers, press mixers, and the like. Vigorous mixing, requiring shear without added heat, may be employed to ensure a homogenous distribution of ingredients in each of the first part 12 and the second part 14. The first part 12 and second part 14 may then be extruded and/or pressed adjacent to each other, using separate extruders and/or presses that converge in a single die, to form the biconstituent adhesive rope shown in FIG. 2, having the interface 17 between first part 12 and second part 14. Once the adhesive rope has been formed, it may be covered with wrapper 16 which, as explained above, can be made of plastic, aluminum foil, paper or the like, but is preferably made of a polyolefin such as polyethylene or polypropylene. After being stored as a coiled rope as shown in FIG. 2, the adhesive rope can be cut into individual slugs 10, having any desired sizes, either at the construction site or before entering the construction site.

EXAMPLES

A highly viscous, essentially solid phase adhesive rope having the configuration shown in FIGS. 2 and 4(a) was prepared, using the following compositions for the first part and the second part, and a weight ratio of 4:3 for the first and second parts. The reason for having more of the first part than the second part is to maintain about 5% less than a stoichiometric balance of hardener in the second part to resin in the first part. Unreacted hardener may facilitate creep of the anchoring adhesive, and the amount of unreacted hardener is minimized by this technique. The first part had a viscosity of 40 million centipoise. The second part had a viscosity of 40 million centipoise. The composition was extruded into a rope having a 0.5-inch diameter. The extruded rope was wrapped in high density polyethylene film having a thickness of 0.5 mil, and was cut into slugs having a length of 4.5 inches.

| First Part (Resin) | |
|---|---|
| Material | % By Weight |
| EPON ® 828 (Bisphenol A Epoxy Resin) | 28.00 |
| Talc 399 (Whitaker, Clark & Daniels) | 17.30 |
| AGSCO ® Sand #1 (silica sand) | 54.70 |
| Total: | 100.00 |

| Second Part (Hardener) | |
|---|---|
| Material | % By Weight |
| ANCAMINE ® 1856 (modified aliphatic amine) | 14.67 |
| ANCAMINE ® K54 (tertiary amine) | 1.73 |
| Talc 399 | 9.33 |
| AGSCO ® Sand #1 | 65.34 |
| Total: | 100.00 |

The inventive, highly viscous, essentially solid-phase rope adhesive, called EXP 220, was evaluated against two prior art epoxy-based liquid adhesives sold by ITW Ramset/Redhead under the names Granite 5 and Ceramic 6. The adhesives were evaluated using 0.5 in. diameter steel anchor rods, and 0.563 in.×4.5 in. boreholes formed in 4000 psi compressive strength concrete. The anchor rods had 1.5-degree tapered threads. The hand-operated driving tool was run at 1600 rpm.

Pullout strengths from dry concrete at ambient temperature were measured at various time intervals after insertion of the anchors, up to 24 hours. Pullout strengths were also measured for concrete which had been under water for 24 hours before and after insertion of the anchors. Pullout strengths were also measured for dry concrete which was maintained at 110° F. for 24 hours before and after insertion of the anchors. The pullout strengths, which are reported in pounds of force, were measured using an Instron load tester. Table 1 shows the pullout strengths resulting from these tests.

TABLE 1

Pullout Strengths (Pounds)

| Example No. | Adhesive | Dry Concrete, 4 Hours | Dry Concrete, 24 hours | Wet Concrete, 24 Hours | Dry Concrete, 110° F., 24 Hours |
|---|---|---|---|---|---|
| 1 | EXP 220 (Inventive) | 15,900 | 16,000 | 12,500 | 14,450 |
| 2 | Granite 5 (Comparative) | 5,900 | 15,700 | 12,500 | 8,500 |
| 3 | Ceramic 6 (Comparative) | 17,300 | 17,900 | 13,500 | 16,300 |

As shown above, the highly viscous rope adhesive of the invention produced an anchoring force higher than one of the prior art liquid epoxy adhesives, and equivalent to another.

In a second set of experiments performed under similar conditions at a different time and location, using similar 4000 psi concrete, the same inventive rope adhesive was tested using the same procedure, versus a) white epoxy putty sticks manufactured by Devcon Co. and sold by Ace Hardware Corp. and others, and b) HVU adhesive made and sold by Hilti AG of Waldstetlen, Germany. The white epoxy putty sticks are typically used for repairs, and are not considered to be an anchoring adhesive. On information and belief, the HVU adhesive is similar to that described in U.S. Pat. No. 5,731,366, issued to Moench et al. The HVU adhesive contains a loose filler phase and a liquid chemical phase contained in capsules dispersed in the filler phase. Both phases are contained in a cylindrical plastic wrapper.

Table 2 shows the average holding strength for each of three adhesives, measured after 24 hours in dry, ambient temperature concrete.

TABLE 2

Pullout Strengths (Pounds)

| Example No. | Adhesive | Dry Concrete, 24 Hours |
|---|---|---|
| 4 | EXP 220 (Inventive) | 12,291 |
| 5 | Devcon putty sticks (Comparative) | 5,382 |
| 6 | Hilti HVU (Comparative) | 12,538 |

As shown above, the inventive highly viscous rope adhesive gave better holding force than the prior art putty sticks and similar holding force to the prior art fluid/capsule adhesive system.

While the embodiments of the invention described herein are presently preferred, various modifications and improvements can be made without departing from the spirit and scope of the invention. The scope of the invention is indicated by the appended claims, and all changes that fall within the meaning and range of equivalents are intended to be embraced therein.

We claim:

1. A rope of chemical anchoring adhesive, comprising:
   a) a first part comprising about 20–45% by weight of an epoxy resin, about 10–40% by weight of a first particulate filler having an oil absorption value of at least about 30, and about 40–65% by weight of a second particulate filler, at least about 70% by weight of the second particulate filler having a U.S. Sieve size between 16 and 45, inclusive; and b) a second part comprising about 5–20% by weight of an amine compound, about 0.1–15% by weight of a tertiary amine compound, about 1–23% by weight of a first particulate filler having an oil absorption value of at least about 30, and about 52–87% by weight of a second particulate filler, at least about 70% by weight of the second particulate filler having a U.S. Sieve size between about 16 and 45.

2. A rope of chemical anchoring adhesive, comprising:

a) 52–65% by weight of a first part comprising about 20–45% by weight of an epoxy resin, about 10–40% by weight of a first particulate filler having an oil absorption value of at least about 30, and about 40–65% by weight of a second particulate filler, at least about 70% by weight of the second particulate filler having a U.S. Sieve size between 16 and 45, inclusive; and b) 35–48% by weight of a second part comprising about 10–18% by weight of an amine compound, about 1–10% by weight of a tertiary amine compound, about 5–18% by weight of a first particulate filler having an oil absorption value of at least about 30, and about 58–72% by weight of a second particulate filler, at least about 70% by weight of the second particulate filler having a U.S. Sieve size between about 16 and 45.

3. The rope of claim 1, having a length-to-diameter ratio of at least about 4.

4. The rope of claim 1, having a length-to-diameter ratio of at least about 10.

5. The rope of claim 1, having a length-to-diameter ratio of at least about 15.

6. The rope of claim 1, further comprising a wrapper.

7. The rope of claim 1, wherein the first and second parts are present in weight ratios which are substantially consistent along the length of the rope.

8. The rope of claim 1, comprising about 20–80% by weight of the first part and about 20–80% by weight of the second part.

9. The rope of claim 1, comprising about 35–75% by weight of the first part and about 25–65% by weight of the second part.

10. The rope of claim 1, comprising about 52–65% by weight of the first part and about 35–48% by weight of the second part.

11. The rope of claim 1, having a cylindrical cross-section.

12. The rope of claim 1, having a threaded cross-section.

13. The rope of claim 1, having a square cross-section.

14. The rope of claim 1, having a rectangular cross-section.

15. The rope of claim 1, having a triangular cross-section.

16. The rope of claim 1, having a curled cross-section.

17. The rope of claim 1, having an elliptical cross-section.

18. The rope of claim 1, wherein at least some of the first part and at least some of the second part are exposed at the surface of the rope.

19. The rope of claim 1, wherein the first and second parts each have a viscosity of about 5 million to about 50 million centipoise.

* * * * *

UNITED STATES PATENT AND TRADEMARK OFFICE
CERTIFICATE OF CORRECTION

PATENT NO.   : 6,403,678 B1
DATED        : June 11, 2002
INVENTOR(S)  : James E. Surjan et al.

It is certified that error appears in the above-identified patent and that said Letters Patent is hereby corrected as shown below:

<u>Title page,</u>
Item [56], References Cited,
-- 4,678,374    7/1987 Calandra, jr.       405    261
   4,105,114    8/1978 Knox et al.         206    319
   4,759,888    7/1988 Brest van Kempen    264    35
   6,033,153    3/2000 Fergusson           405    259.6

FOREIGN PATENT APPLICATION
   55165398    12/1980    Japan (Abstract)    E21D   20/02
   2 289 737   11/1995    Great Britain       F16B   13/14 --

Signed and Sealed this

Third Day of September, 2002

Attest:

*Attesting Officer*

JAMES E. ROGAN
*Director of the United States Patent and Trademark Office*